United States Patent
Skärby et al.

(10) Patent No.: US 12,250,071 B2
(45) Date of Patent: Mar. 11, 2025

(54) LINK ADAPTATION OPTIMIZED WITH MACHINE LEARNING

(71) Applicant: Telefonaktiebolaget LM Ericsson (publ), Stockholm (SE)

(72) Inventors: Christian Skärby, Stockholm (SE); Henrik Nyberg, Stockholm (SE); Raimundas Gaigalas, Hässelby (SE); Tor Kvernvik, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 504 days.

(21) Appl. No.: 17/440,209

(22) PCT Filed: Mar. 18, 2019

(86) PCT No.: PCT/SE2019/050238
§ 371 (c)(1),
(2) Date: Sep. 17, 2021

(87) PCT Pub. No.: WO2020/190181
PCT Pub. Date: Sep. 24, 2020

(65) Prior Publication Data
US 2022/0149980 A1    May 12, 2022

(51) Int. Cl.
*H04L 1/00*   (2006.01)
*G06N 3/02*   (2006.01)

(52) U.S. Cl.
CPC .............. *H04L 1/0017* (2013.01); *G06N 3/02* (2013.01); *H04L 1/0003* (2013.01);
(Continued)

(58) Field of Classification Search
CPC ... H04L 1/0007; H04L 1/1887; H04L 1/1816; H04L 1/0025; H04L 2001/0093
See application file for complete search history.

(56) References Cited

U.S. PATENT DOCUMENTS

| | | |
|---|---|---|
| 11,075,929 B1 | 7/2021 | Li et al. |
| 2002/0072885 A1 | 6/2002 | Tang |

(Continued)

OTHER PUBLICATIONS

International Search Report and Written Opinion dated Nov. 6, 2019 in International Application No. PCT/SE2019/050238 (14 pages total).

(Continued)

*Primary Examiner* — Anez C Ebrahim
(74) *Attorney, Agent, or Firm* — Rothwell, Figg, Ernst & Manbeck, P.C.

(57) ABSTRACT

Methods and systems for dynamically selecting a link adaptation policy, LAP. In some embodiments, the method includes generating a machine learning, ML, model, wherein generating the ML model comprises providing training data to an ML algorithm. The method further includes using channel quality information, additional information, and the ML model to select a LAP from a set of predefined LAPs. In some embodiments, the additional information comprises: neighbor cell information about a second cell served by a second TRP, distance information indicating a distance between a UE and a first TRP, and/or gain information indicating radio propagation gain between the UE and the serving node. The method further includes the first TRP transmitting second data to the UE using the selected LAP.

15 Claims, 12 Drawing Sheets

(52) U.S. Cl.
CPC .......... *H04L 1/0009* (2013.01); *H04L 1/0026* (2013.01); *H04L 1/0034* (2013.01)

(56) References Cited

U.S. PATENT DOCUMENTS

| | | | |
|---|---|---|---|
| 2009/0103598 A1 | 4/2009 | Chuang et al. | |
| 2009/0286468 A1* | 11/2009 | Kim | H04L 1/1887 455/3.03 |
| 2010/0189075 A1* | 7/2010 | Iwamura | H04W 36/0055 370/331 |
| 2010/0317355 A1 | 12/2010 | Zangi et al. | |
| 2012/0106370 A1* | 5/2012 | Radulescu | H04W 24/10 370/252 |
| 2012/0184220 A1 | 7/2012 | Zhang et al. | |
| 2014/0064109 A1 | 3/2014 | Krishnamurthy | |
| 2016/0156430 A1 | 6/2016 | Madan et al. | |
| 2017/0105210 A1 | 4/2017 | Mar et al. | |
| 2019/0052396 A1 | 2/2019 | Skärby | |
| 2019/0349905 A1 | 11/2019 | Matsuda et al. | |
| 2020/0236559 A1* | 7/2020 | Spiotta | H04W 16/18 |
| 2022/0182175 A1 | 6/2022 | Kvernvik et al. | |

OTHER PUBLICATIONS

International Search Report and Written Opinion dated Nov. 6, 2019 in International Application No. PCT/SE2019/050239 (14 pages total).

Saishankar, K.P. et al., "Reinforcement learning techniques for Outer Loop Link Adaptation in 4G/5G systems", ARXIV.org, Cornell University Library, Olin Library Cornell University, Ithaca, NY, arXiv; 1708.00994v1, Aug. 3, 2017, XP080951203 (26 pages total).

Auer, P. et al., "The Nonstochastic Multiarmed Bandit Problem", Society for Industrial and Applied Mathematics, Siam J. Comput., 2002, vol. 32, No. 1, pp. 48-77 (30 pages total).

Allesiardo, R. et al., "A Neural Networks Committee for the Contextual Bandit Problem", Sep. 29, 2014, arXiv:1409.8191v1 (8 pages total).

Franzen, C., "Neural Networks for Contextual Multi-armed Bandits: Neural Bandit, a neural networks committee for the contextual bandit problem", May 9, 2017, The Wayback Machine, https://web.archive.org/web/20170810185447/ http://charlesfranzen.com:80/posts/neural-networks-for-contextual-multi-armed-bandits/ (17 pages total).

Li, L. et al., "A Contextual-Bandit Approach to Personalized News Article Recommendation", WWW 2010, Full Paper, Apr. 26-30, Raleigh, NC USA (10 pages total).

Non-Final Office Action dated Jan. 5, 2024 in related U.S. Appl. No. 17/440,030 (27 pages).

\* cited by examiner

Experiment with BLER(1)

Experiment with BLER(2)

⋮

Experiment with BLER(N)

LINK ADAPTATION OPTIMIZED WITH MACHINE LEARNING

CROSS REFERENCE TO RELATED APPLICATION(S)

This application is a 35 U.S.C. § 371 National Stage of International Patent Application No. PCT/SE2019/050238, filed Mar. 18, 2019.

TECHNICAL FIELD

Disclosed are embodiments related to link adaptation optimization.

BACKGROUND

Link adaptation or rate adaptation is a known technique used in wireless telecommunication technologies with channel-dependent transmission such as High-Speed Downlink Packet Access (HSDPA), Long-Term Evolution (LTE) or New Radio (NR). To achieve very high data rates, link adaptation adjusts transmitted data packet size at very short time periods (e.g., several milliseconds or even shorter) to the reported instantaneous channel quality for each receiving terminal.

Link adaptation relies on channel quality reports from the terminal (e.g., a User Equipment (UE)). However, channel quality reports are received with delays, which may depend on a terminal receiver type or systematic filtering by the terminals. Such delays introduce an error into the channel quality reports and uncertainty when selecting a data packet size for data transmission, which may result in suboptimal transmission performance.

Differences between the real and the reported channel quality may be particularly large in scenarios with rapidly varying channel conditions. Such scenarios are rather common and may occur due to, for example, certain radio environment conditions, a fast moving terminal or sudden changes in traffic in neighboring cells which may all result in rapidly varying inter-cell interference.

Hence, link adaptation needs to be adjusted to compensate for inaccurate channel quality reports in order to achieve data transmission with high performance.

SUMMARY

The target for data traffic is a high bitrate. Link adaption uses various transmission rates, corresponding to various combinations of coding and modulation (MCSs), to optimally adapt to current channel and interference conditions. The number of such transmission rates has increased in LTE and NR compared to HSDPA.

A well adopted link adaptation strategy is to try to maintain a certain rate of decoding errors. In the context of the current disclosure, the certain rate of decoding errors will be referred to as the Block Error Rate (BLER) and a target achievable BLER will be referred to hereinafter as the BLER target. Link adaptation for a UE has a desired BLER target depending on traffic type (e.g., data and voice) and QoS requirements.

For the purpose of explanation, let us assume that the BLER target corresponds to what the average user considers good transmission quality. If the BLER is below the BLER target, it is possible to save resources by decreasing the robustness of data transmission without sacrificing user experience. On the other hand, if the BLER is above the BLER target, the robustness of data transmission must be increased to achieve the desired user experience.

In conventional methods, a fixed common BLER target is frequently used for UEs with the same type of traffic and constant in time. The fixed BLER target is set such that optimal (high) bitrates may be provided in certain instances.

The fixed common BLER target, however, fails to provide optimal bitrates in dynamic or rapidly varying channel conditions when combined with inaccurate channel quality reports. The fixed common BLER target may be considered as a fixed margin to adjust for the uncertainty in channel conditions. However, the fixed margin may not be ideal for situations when the error between the reported and real channel conditions is varying in an inhomogeneous way which may very well be the case when channel conditions are varying very rapidly.

Accordingly, using a fixed common BLER target may be particularly problematic in scenarios with rapidly varying inter-cell interference. In such scenarios, a fixed BLER target with a high value may be desirable for the UEs that experience such interference. However, setting a high value fixed BLER target for all UEs at all times will lead to substantially decreased throughput and spectral efficiency (SE). On the other hand, a fixed BLER target with a low value will lead to suboptimal performance for the UEs that are experiencing rapidly varying inter-cell interference.

Conventional methods of addressing the problem of inaccurate channel quality reports include dynamically adjusting the link adaptation policy based on an estimated uncertainty of the channel quality reports. Examples of such methods include setting a dynamic BLER target based on an estimated variance of the channel quality reports or adding an offset to the channel quality based on the observed HARQ BLER (the latter method is also referred to as CQI adjustment).

Such methods of dynamic adjustment, however, may face further implementation challenges. One problem is that channel quality reports are often systematically filtered by the terminals. In particular, fast channel variations are often filtered away and not reported by the terminals. Additionally, filtering may be different for different terminal types.

Another problem with such methods of dynamic adjustment is that even in instances in which an uncertainty of the channel quality report is estimated exactly, for example, in terms of variance measure, there is no straightforward way to incorporate the exact estimate into the link adaptation so that it would yield optimal transmission performance. A common strategy in such instances of higher uncertainty is to use higher transmitted packet sizes. The heuristics behind this common strategy is that, due to HARQ, if data is transmitted at a rate that is too high, nothing is really lost because the rate may be lowered afterwards. This however, may result in longer transmission times and even data packet losses.

Moreover, estimation of the uncertainty of the channel quality report has to be performed with rather short time constraints. Most of the data transmissions are known to be shorter than one second. Consequently, there is a high probability that the estimates may suffer high uncertainty.

Reconstructing fast channel quality variations removed by systematic terminal filtering has been addressed in a specific case of fast varying inter-cell interference. To gain knowledge about the channel variations that occur due to sudden traffic changes in the neighboring cells, base stations may report their scheduled instantaneous traffic activity to each other.

This approach introduces large amounts of time-critical signaling, which imposes a difficult challenge in terms of implementation. Under this approach, each cell has to report both its intended packet size to neighbor cells and to adjust that packet size according to the activity reports received from neighbor cells within the same transmission period. This requires an extremely fast communication channel between base stations in addition to extremely fast link adaptation implementation.

In some instances, the embodiments disclosed herein periodically apply an updated link adaptation policy (LAP) based on patterns observed in the channel quality reports together with patterns observed in additional measurements of other affecting factors. In some embodiments, the LAP is selected by a Machine Learning (ML) algorithm. In some embodiments, the ML algorithm is trained to map the time series observations of the channel quality reports and time series observations of additional measurements during some historic period of time to the optimal policy for the upcoming period in the future.

In some embodiments, the LAP may be a dynamic offset for channel quality report or a selected data packet size for the next transmission directly. As a non-limiting example, the LAP may indicate a dynamically updated BLER target. Additional measurements may include, for example, neighbor cell activity reports, signal strength to the best cell and neighbor cells, distance to the best cell and neighbor cells, measured attenuation of the signal to the best cell, among others.

Some advantages provided by the embodiments disclosed herein include the use of the ML algorithm which is able to reconstruct information missing from channel quality reports based on relevant additional measurements and to implicitly incorporate the reconstructed information into the mapping of input time series to an optimal policy for the upcoming time period.

This is in contrast to existing conventional methods which only try to measure the uncertainty of the channel quality reports, such as, for example, dynamic BLER target based on variance of channel quality reports. By reconstructing the missing information, the embodiments disclosed herein achieves better performance.

The embodiments disclosed herein also have an advantage over the existing conventional methods which incorporate additional measurements by explicit algorithms such as dynamic offset to the channel quality based on the observed HARQ BLER (CQI Adjustment). One embodiment utilizes a ML algorithm which maps the observed time series of the channel quality reports and additional measurements directly to the predicted optimal policy. Hence, the ML algorithm can learn more advanced highly non-linear policies which cannot possibly be described by an explicit algorithm. Moreover, the ML algorithm can be trained to mimic traditional algorithms.

Some embodiments disclosed herein enables the selection of a dynamic and UE-adapted policy for Link Adaptation using a ML model that utilizes additional input information such as neighbor cell activity and UE related information. Compared to conventional methods of link adaptation, the ML model methods disclosed herein make it possible to optimize the decision rules in a much larger function space than allowed by simple man-made rules. Accordingly, some embodiments disclosed herein achieve near-optimal performance for a set of chosen training scenarios. In contrast, conventional methods of link adaptation are typically limited to decision making based on fixed and simple rules based on a limited number of input features.

In an aspect, there is provided a method for dynamically selecting a link adaptation policy, LAP. The method includes generating a machine learning, ML, model, wherein generating the ML model comprises providing training data to an ML algorithm. The method includes a first transmission point, TRP, transmitting first data to a user equipment, UE, using a first LAP, wherein the first TRP serves at least a first cell. The method includes receiving a channel quality report transmitted by the UE, the channel quality report comprising channel quality information indicating a quality of a channel between the UE and the first TRP. The method includes obtaining additional information, wherein the additional information comprises: neighbor cell information about a second cell served by a second TRP, distance information indicating a distance between the UE and the first TRP, and/or gain information indicating a radio propagation gain between the UE and the serving node. The method includes using the channel quality information, the additional information, and the ML model to select a LAP from a set of predefined LAPs, the set of predefined LAPs comprising the first LAP and a second LAP. The method includes the first TRP transmitting second data to the UE using the selected LAP.

In some embodiments, the selected LAP indicates a block error rate (BLER) target and transmitting the second data to the UE using the selected LAP comprises transmitting the second data to the UE using the BLER target.

In some embodiments, transmitting the second data to the UE using the BLER target comprises selecting a transport block size, TBS, based on the BLER target and transmitting the second data to the UE using the selected TBS.

In some embodiments, the additional information further comprises neighbor cell information about a third cell served by a third TRP.

In some embodiments, the neighbor cell information about the second cell and/or the third cell comprises Physical Resource Block, PRB, utilization.

In some embodiments, the distance information indicating a distance between the UE and the first TRP comprises a timing advance, TA, indicator transmitted by the UE.

In another aspect, there is provided a computer program comprising instructions which, when executed by processing circuitry, causes the processing circuitry to perform any of the methods described above.

In another aspect, there is provided a first transmission point (TRP) adapted to perform any of the method described above.

Another advantage of the embodiments disclosed herein is the ability to generalize by utilizing ML methods. First, a ML method provides flexibility with respect to how much the DL link adaption policy can be tailored to a specific radio environment scenario. The ML model may be trained to reach very high performance in specific radio environment scenarios while simultaneously maintaining good performance in many other scenarios. Conventional link adaptation algorithms typically require a new instance of an algorithm with different parameters for each class of scenarios.

Moreover, the generalization property makes it possible to improve the ML model retroactively. The ML model may be retroactively fitted to a new scenario that it had not encountered during the initial training. Conventional link adaptation algorithms typically require the creation of a new instance of the algorithm with different parameters that would not maintain the same performance for other scenarios.

Another advantage of selecting a LAP with a ML model is that the ML model can make decisions based only on historical information by learning and predicting patterns based on past channel variations. In contrast, conventional methods of link adaptation, such as coordinated link adaptation, require instantaneous information about, for example, neighbor cell activity.

BRIEF DESCRIPTION OF THE DRAWINGS

The accompanying drawings, which are incorporated herein and form part of the specification, illustrate various embodiments.

DETAILED DESCRIPTION

To solve the above noted problems with conventional methods of link adaptation, disclosed herein are embodiments directed to using ML to obtain an optimized dynamic BLER target.

We now consider an exemplary scenario where there exists rapidly varying downlink (DL) inter-cell interference to describe the embodiments disclosed herein. The embodiments disclosed herein may be particularly beneficial in this exemplary scenario. Rapidly varying DL inter-cell interference may be rather common in LTE, NR, HSDPA or other wireless communication technologies with non-orthogonal DL transmissions. However, the exemplary scenario is in no way limiting and the embodiments disclosed herein may be applied to various alternative scenarios.

Let us now consider a UE running a common Internet application such as world-wide-web, video or social media service and receiving data in DL from a radio base station (RBS) for a relatively long time, for example, several seconds or minutes. While the number of active UEs in wireless networks is quite large, the majority of the active UE connections are short and devoted to multiple transmissions including a small number of data packets. This is because the majority of smartphone applications transmit small amounts of data in short bursts.

Accordingly, there is a high probability that the considered active UE in a cell and the majority of other active UEs in neighboring cells with Internet traffic are each active for short time periods. This results in rapidly varying resource allocation in the neighboring cells. Hence, the considered active UE will experience rapidly varying inter-cell interference.

In one embodiment, a UE receives Internet traffic data in DL from a RBS and the UE experiences rapidly varying inter-cell interference from the neighbor cells transmitting data to associated UEs in short bursts.

Figure 1:
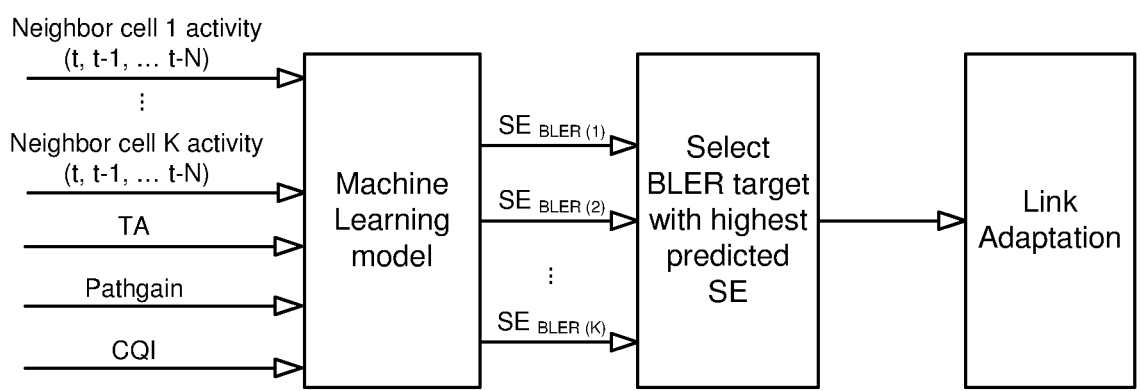
FIG. 1 shows dynamic BLER target selection with a Machine Learning model according to one embodiment.

In this embodiment, link adaptation is deployed together with a dynamic BLER target set individually for each UE for a short period of time (e.g., sub-seconds). The BLER target is selected by a ML algorithm based on channel quality reports together with additional measurements such as neighbor cell activity, path gain to the serving cell, timing advance information and possibly other measurements, as shown in FIG. 1.

It is also assumed that RBSs can report neighbor cell scheduling activity to each other via communication links. Examples of such communication links include a X2 interface in LTE, a Xn interface in NR or a combined Iub-Iur interface in HDSPA.

In some embodiments, dynamic BLER target is combined with a ML model for optimal BLER target selection. While it is known that a dynamic BLER target may yield a better transmission performance compared to a static BLER target in a scenario with rapidly varying inter-cell interference, it is difficult to find a simple mapping from channel quality measurements to an optimal BLER target. The difficulty lies in dynamic channel variations and missing information.

The advantage of selecting the BLER target with the ML model is that the ML model learns and predicts patterns in the experienced dynamic channel variations based on additional historical information, for example, neighbor cell scheduling activity during some historical period. This enables the reconstruction of information missing from the channel quality reports and the creation of a mapping of input time series to the optimal BLER target for the upcoming time period.

In some embodiments, the dynamic BLER target is used for a UE experiencing rapidly varying inter-cell interference from neighbor cells. FIG. 1 illustrates a procedure in which the ML model is used to select a close-to-optimal BLER target. This procedure is described in further detail below with reference to FIG. 1.

In some embodiments, a range of possible BLER targets is chosen. For example, the range of possible BLER targets may be limited to a finite set: $\{BLER_1, BLER_2, \ldots, BLER_K\}$. The ML model selects one of the possible BLER targets as a close-to-optimal BLER target for the considered UE during the upcoming data transmission time period.

As shown in FIG. 1, input measurements for the ML model are collected, fed into the ML model, and the ML model outputs are collected at each data transmission time period. The input measurements describe or are related to factors that influence the considered UE's radio environment, e.g., neighbor cell activity, variation at some historical time period. In some embodiments, the input measurements may include: (1) resource utilization in a number of neighbor cells; (2) channel quality reports (e.g., Channel Quality Indicator (CQI)); (3) path gain to the serving cell; (4) timing advance to the serving cell; and other relevant measurements. The resource utilization may be indicated by a vector with historical data (e.g., Neighbor cell 1 activity at times (t, t−1, . . . t−N), . . . , Neighbor cell M activity at times (t, t−1, . . . t−N)). The timing advance may provide an indication of the distance from the cell center for each UE.

The ML model uses the input measurements to predict the performance of the DL data transmissions to the considered UE in the upcoming data transmission time period for each of the BLER targets in the chosen set of BLER targets based on the current interference pattern. The ML model outputs the predicted performance for each of the BLER targets. For example, the predicted performance for each of the BLER targets may be indicated as Spectral Efficiency: {SE($BLER_1$), SE($BLER_2$), . . . , SE($BLER_K$)}. In some embodiments, a plurality of ML models may use the input measurements to predict the performance of the DL data transmissions to the considered UE and output the predicted performance.

As shown in FIG. 1, the BLER value among a fixed set of chosen BLER targets with highest predicted performance is selected as the BLER target for the upcoming period.

In some embodiments, the procedure for using ML model to select a close-to-optimal BLER target comprises: (1) collect input measurements for a current data transmission period; (2) feed the collected input measurements into the ML model and obtain the predicted performance for the possible BLER targets in a chosen set of BLER targets for the next data transmission period; and (3) select the BLER target with highest predicted performance. In some embodiments, the obtained predicted performance for the possible BLER targets may indicated as SE($BLER_1$), SE($BLER_2$), . . . , SE($BLER_K$). In some embodiments, selecting the BLER target with the highest predicted performance may be shown as $BLER_{target}=\mathrm{argmax}_k \, SE(BLER_k)$.

As shown in FIG. 1, the selected BLER target is passed into DL link adaptation. The selected BLER target is used for link adaptation during the next update period to select close-to-optimal transport block sizes. In some embodiments, transport block sizes are selected at shorter time periods (e.g., several ms or shorter) than the BLER target (e.g., 10-1000 ms).

In some embodiments, the ML model for the BLER target selection is obtained based on supervised learning. Supervised learning is a way to build a mathematical model by estimating the relation between a number of known input and known output examples.

In some embodiments, a procedure of supervised learning starts by collecting the input and output sample pairs from a target environment. Then, a suitable function with possibly random parameters is chosen as an initial model. This is followed by a "training" procedure where the collected input samples are fed into the function and its parameters are gradually adjusted to produce outputs that are as close as possible to the desired output samples according to a chosen loss metric, e.g., mean squared error. The model is considered to be sufficiently well trained when the model produces outputs that are close enough to the desired output set for a given test set of inputs that have not been used for training. Some non-limiting examples of functions used for supervised learning include artificial neural networks and decision trees.

Some exemplary ML model configurations for BLER target selection are now described. Let us consider an embodiment in which dynamic BLER target is used for a UE experiencing rapidly varying inter-cell interference from neighbor cells and the ML model for BLER target selection comprises the structure shown in FIG. 1 and further described in related description. It is assumed that a finite set of possible BLER targets is chosen {$BLER_1$, $BLER_2$, . . . , $BLER_K$}. Accordingly, the ML model (or a plurality of ML models) predicts spectral efficiency values {SE($BLER_1$), SE($BLER_2$), . . . , SE($BLER_K$)} in the upcoming data transmission period for each of the BLER targets in the set.

Figure 2:
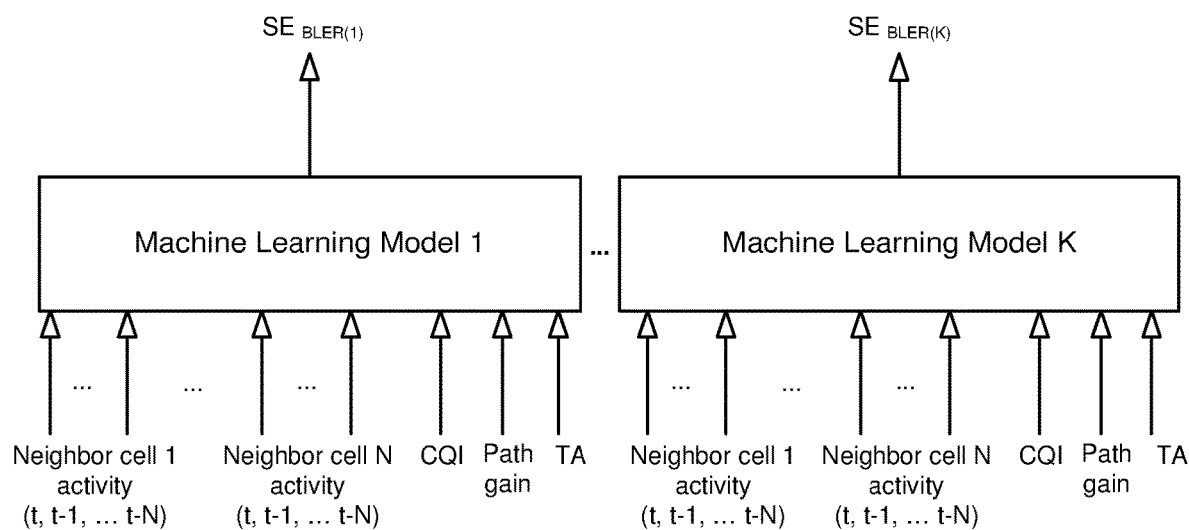
FIG. 2 shows a plurality of Machine Learning models for BLER target selection according to one embodiment.

Some possible ML model configurations for BLER target selection in this embodiment includes, but is not limited to, the following:

1. A plurality of ML models with a single output for spectral efficiency. As shown in FIG. 2, a set of ML models is trained, where the set includes one ML model for each BLER target. Each ML model has the same inputs as described above and one output for spectral efficiency for the corresponding BLER target.

Figure 3:
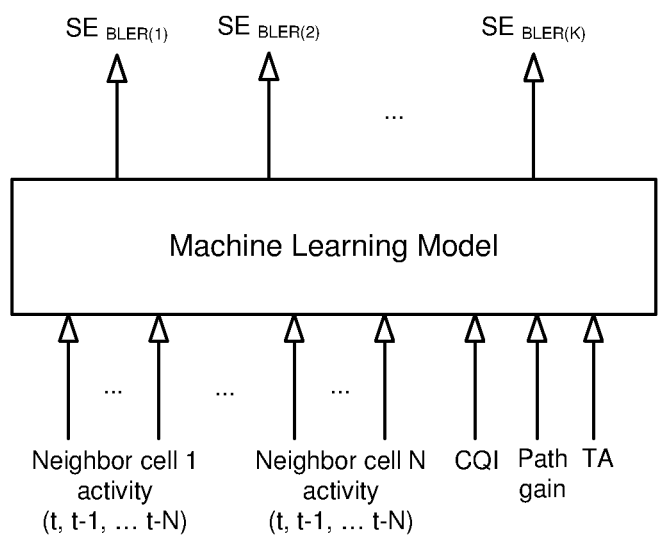
FIG. 3 shows a Machine Learning model with multiple outputs for BLER target selection according to one embodiment.

2. One ML model with multiple outputs for spectral efficiency. As shown in FIG. 3, one common ML model is trained, with multiple outputs, where each output predicts spectral efficiency for one BLER target in the set.

Figure 4:
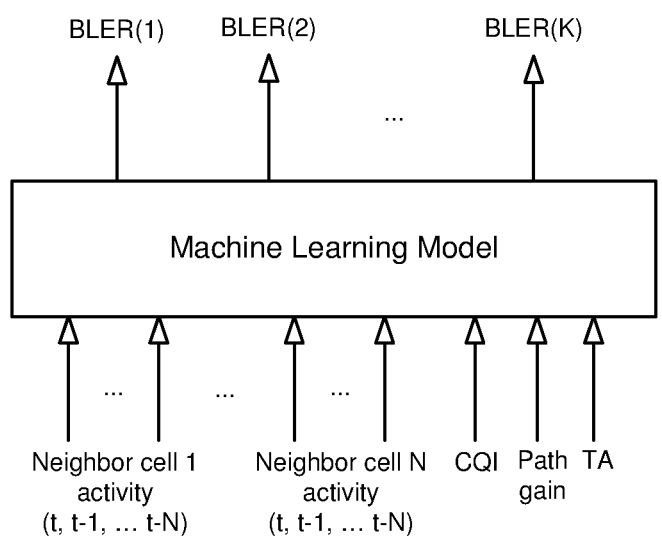
FIG. 4 shows a Machine Learning classifier for BLER target selection according to one embodiment.

3. One model with multiple outputs for BLER target selection. As shown in FIG. 4, one common ML model is trained, with multiple outputs, where each output predicts a probability for each BLER target in the set for being the optimal BLER target.

In some embodiments, software packages for ML may be used to implement the ML model disclosed herein. For example, software packages provided by Python, Tensorflow, Keras, Scikit-learn, deeplearning4j, Pytorch, Caffe, MXnet, and Theano may be used to implement the ML model disclosed herein.

The performance of embodiments disclosed herein has been evaluated using computer simulations. Specifically, the ML model performance in simulations for DL link adaptation has been evaluated and is explained in further detail below.

A simulator for DL link adaptation for LTE or NR has been used to generate input and output data sets for the ML model training. The chosen simulation scenario is modeling a UE 510 with large amount of DL traffic from a first cell 505 where the UE 510 experiences rapidly varying inter-cell interference from neighbor cells 515a-e transmitting data to UEs in short bursts. It is assumed that the domain of possible BLER targets is limited to a finite set {$BLER_1$, $BLER_2$, . . . , $BLER_K$}.

Figure 5:
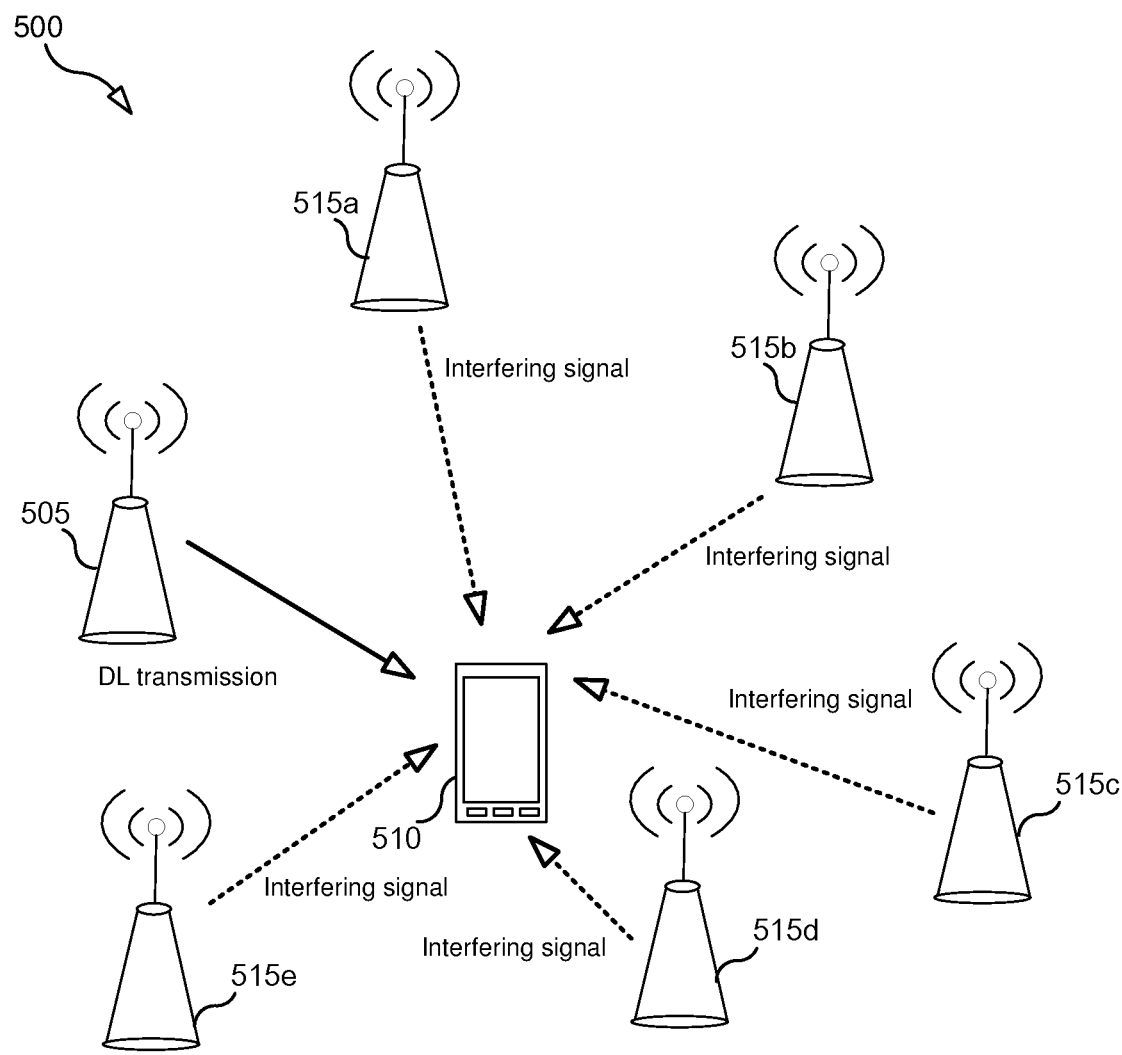
FIG. 5 shows a UE experiencing downlink inter-cell interference from neighbor cells in a network according to one embodiment.

As shown in FIG. 5, the first cell 505 is modeled in detail with basic DL link adaptation operating in a fading radio channel. The first cell 505 has a number of neighbor cells ("interferers") 515a-e placed in a grid as shown in FIG. 5. Each neighbor 515a-e cell transmits an interfering signal with a certain probability at each transmission period causing further dips in the signal quality in the first cell 505. The network 500 shown in FIG. 5 may be an LTE and/or a NR network according to some embodiments.

The UE 510 with a large amount of DL traffic is randomly placed in the cell 505 and data transmissions are simulated for a predetermined time period (e.g., 2-4 seconds). In a single simulation experiment, one data input and output sample is generated by logging the required model input and output measurements as time series. The simulation experiment is repeated a large number of times (e.g., 100000-1000000 times). A new random position for the UE 510 is chosen for each simulation experiment.

Figure 6:
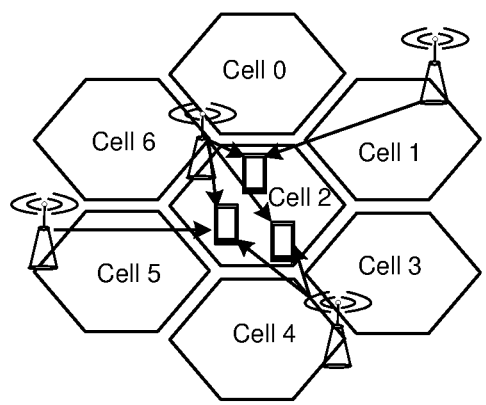
FIG. 6 shows training data collection for a supervised Machine Learning model with a finite set of BLER targets according to one embodiment.
Figure 6:
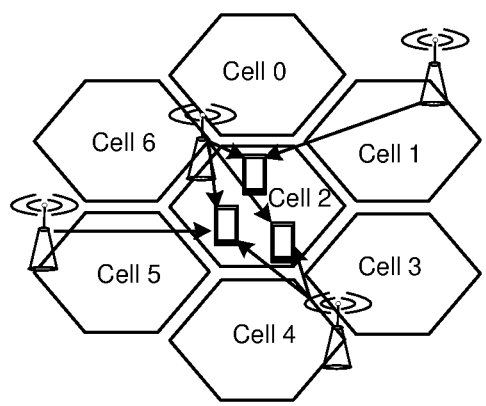
Figure 6:
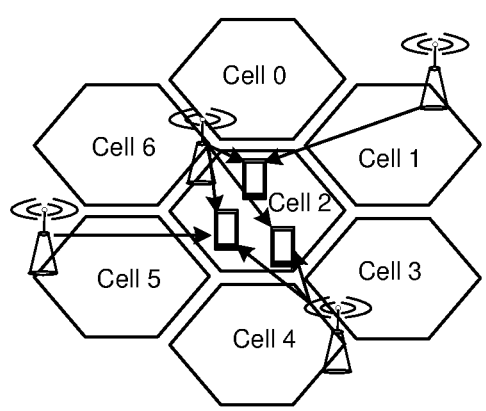

Each simulation experiment is repeated for each of the BLER targets in the set of BLER targets with the UE 510 placed at the same random position and experiencing the same interference pattern. Accordingly, one round of simulation experiments produces a set of transmission performance measurements, e.g. Spectral Efficiency: {SE($BLER_1$), SE($BLER_2$), . . . , SE($BLER_K$)} corresponding to the ML model output, as shown in FIG. 6. The experiment inputs for the simulation includes deployment, traffic model, and random seed. For each of the experiments with BLER (1), BLER(2), up to BLER(N), the model inputs include CQI, neighbor cell activity, TA, and path gain and the model outputs for each respective experiment is the spectral efficiency, e.g., spectral efficiency of BLER(1), spectral efficiency of BLER(2), etc.

Given the data obtained from the simulation experiments, the generated input and output data sets are used to train a ML model (or a plurality of ML models) using a supervised learning procedure. Finally, the ML model performance is evaluated in terms of the prediction accuracy.

Figure 7:
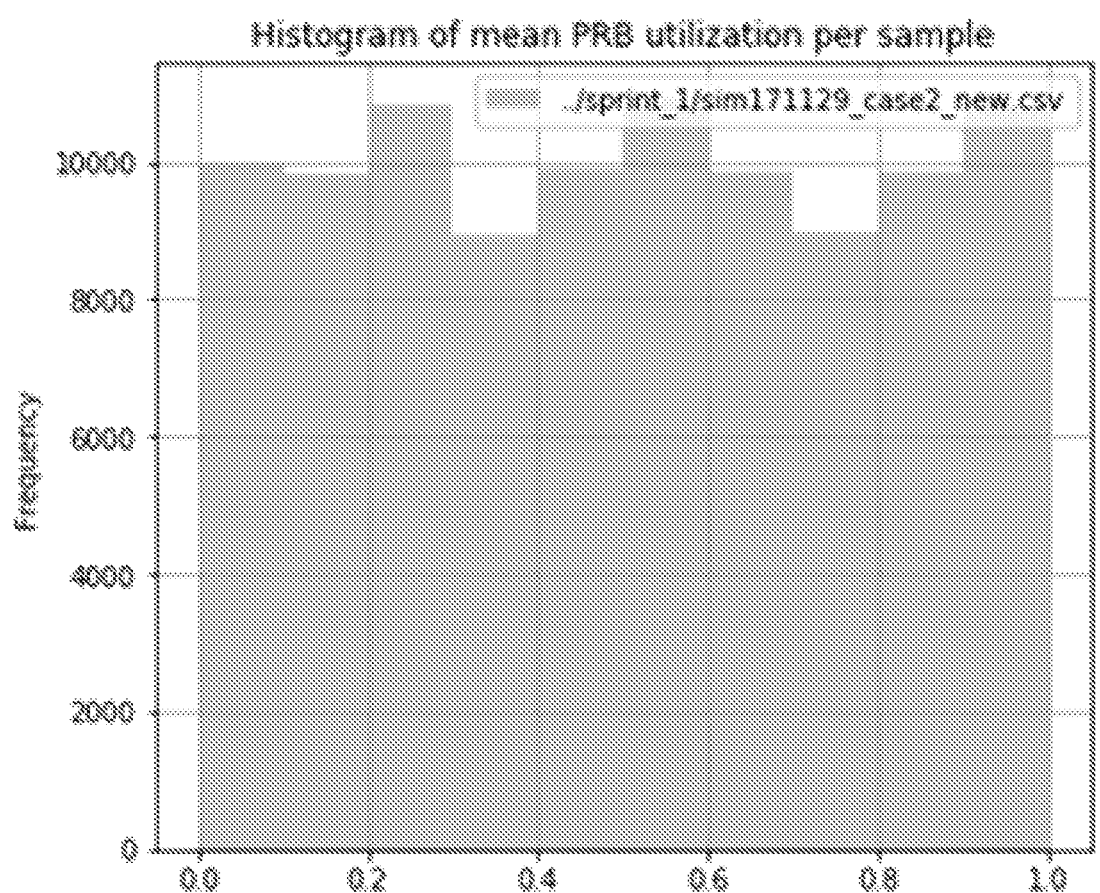
FIG. 7 shows a histogram of Physical Resource Block (PRB) utilization in a cell according to one embodiment.

With respect to the parameters for the simulation experiments, the simulated scenario models a cell with a mix of high and low loads, where all load values occur equally often. That is, the load is approximately uniformly distributed, as indicated by the histogram shown in FIG. 7 of Physical Resource Block (PRB) utilization in the cell 505. In some embodiments, other distributions may be used for the load depending on, for example, how the model is going to be used. For example, the model may be used for urban or suburban scenarios.

The finite set of possible BLER targets are provided by the set {0.05, 0.1, 0.2, 0.3, 0.5, 0.7, 0.9}. A 3-layer neural network with multiple outputs (which may also be referred to as a neural network with two hidden layers), as shown in FIG. 3, has been used as the ML model and each output is a predicted spectral efficiency for each corresponding BLER target.

The inputs for ML model were provided as follows: (1) mean and standard deviation for PRB utilization for three neighbor cells; mean signal to noise ratio (SINR); distance to the serving eNodeB; and pathgain to the serving cell.

Finally, the ML model had been trained on 100,000 simulated input and output samples.

Figure 8:
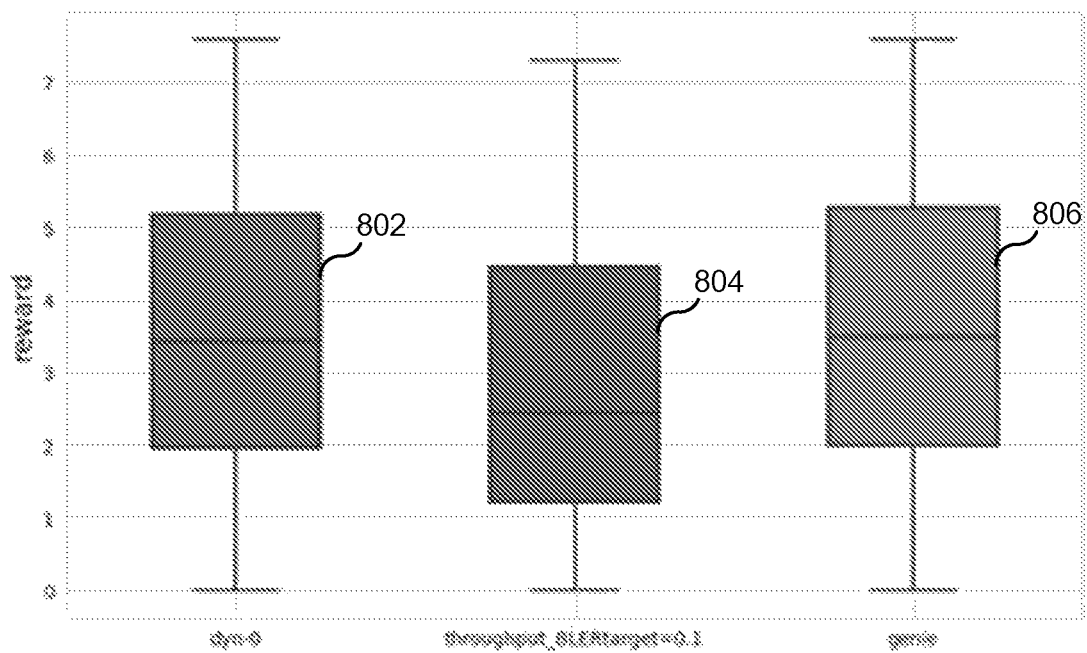
FIG. 8 shows box plots for distributions of spectral efficiency according to some embodiments.
Figure 9:
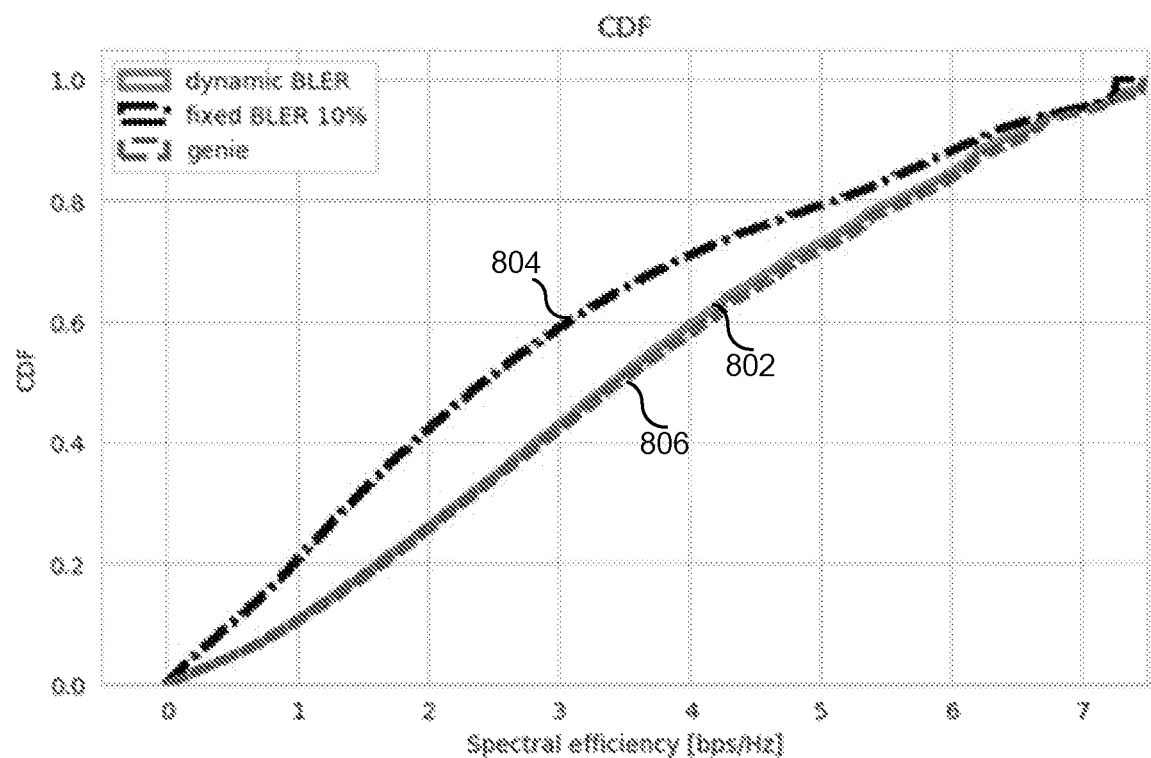
FIG. 9 shows CDF plots for distributions of spectral efficiency according to some embodiments.

FIGS. 8 and 9 show the observed distributions for spectral efficiency for the UE experiencing rapidly varying inter-cell interference with three different link adaptation algorithms. The first algorithm 802 uses dynamic BLER target selected with the ML model, the second algorithm 804 uses a fixed 10% BLER target and the third algorithm 806, hereafter referred to as the "genie" algorithm, is a full-tree search algorithm setting the optimal BLER target from the given finite set at each transmission instant. This is in contrast to dynamic BLER, which has a comparatively sparse BLER target selection. FIG. 8 shows box plots for the distributions and FIG. 9 shows CDF plots. FIG. 8 shows observed distributions for spectral efficiency for three link adaptation algorithms: dynamic BLER selected with the ML model (802), fixed 10% BLER (804), and the best possible dynamic BLER target from the considered finite set (806). FIG. 9 shows the observed CDF for spectral efficiency for three link adaptation algorithms: dynamic BLER selected with the ML model (802), fixed 10% BLER (804), and the best possible dynamic BLER target from the considered finite set (806).

The full-tree "genie" search algorithm 806 shows the highest possible potential of replacing static BLER target by a dynamic one, but cannot be implemented in the reality. It requires knowing all possible spectral efficiency outcomes for all chosen BLER target values, which is only possible in simulation experiments. In reality, only one spectral efficiency outcome corresponding to the chosen BLER value is known.

By comparing the estimated mean values from the box plots in FIG. 8, it can be observed that the available potential for setting BLER target dynamically with the "genie" full-tree search algorithm 806 may be up to 40% spectral efficiency gain on average. Deploying dynamic BLER target set by a ML model 802 is almost as good as the "genie" algorithm 806 and yields up to 36% spectral efficiency gain on average.

By further inspecting the CDF plots in FIG. 9, it can be seen that dynamic BLER target selected with the ML model 802 yields higher spectral efficiency than fixed 10% BLER target 804 in most load cases. Up to 30% gains in spectral efficiency can be achieved for certain loads and UE positions. The CDF is formed with samples where both neighbor cell load and UE positions are varied. Also, performance of dynamic BLER target selected with the ML model is very close to the best optimal one achieved by the "genie" algorithm 806.

Figure 10:
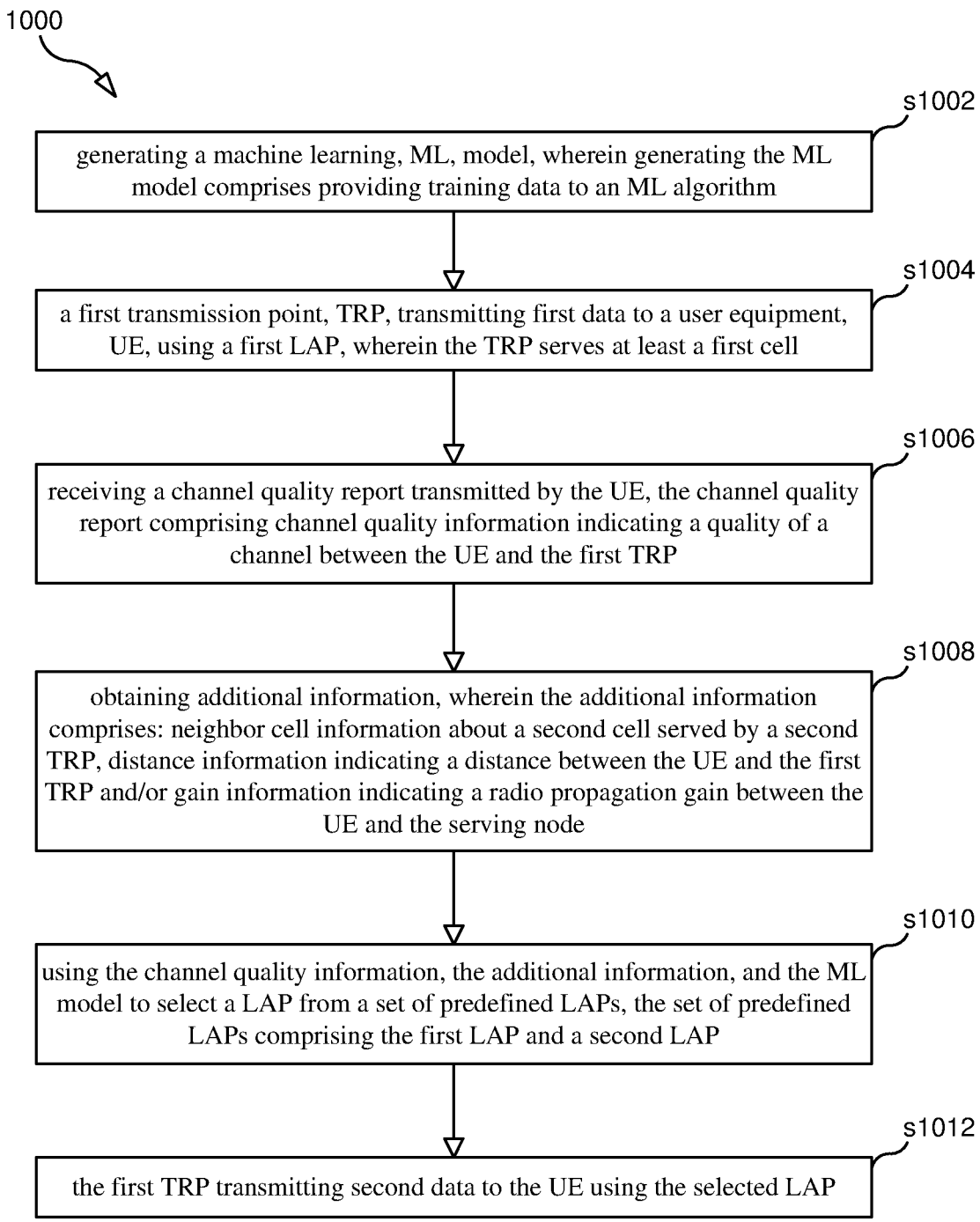
FIG. 10 is a flow chart illustrating a process according to one embodiment.

FIG. 10 is a flow chart illustrating a process 1000, according to some embodiments, that is performed in a communication network for dynamically selecting a link adaptation policy, LAP. Process 1000 may begin with step s1002 in which a machine learning, ML, model is generated, wherein generating the ML model comprises providing training data to an ML algorithm. In step s1004, a first transmission point, TRP, transmits first data to a user equipment, UE, using a first LAP, wherein the first TRP serves at least a first cell. In step s1006, a channel quality report transmitted by the UE is received, wherein the channel quality report comprises channel quality information indicating a quality of a channel between the UE and the first TRP. In step s1008, additional information is obtained, wherein the additional information comprises: neighbor cell information about a second cell served by a second TRP, distance information indicating a distance between the UE and the first TRP (e.g., a timing advance, TA, indicator transmitted by the UE), and/or gain information indicating a radio propagation gain between the UE and the serving node (e.g., an average gain). In step s1010, a LAP is selected from a set of predefined LAPs using the channel quality information, the additional information, and the ML model. In some embodiments, the set of predefined LAPs comprising the first LAP and a second LAP. In step s1012, the first TRP transmits second data to the UE using the selected LAP.

In some embodiments, the selected LAP indicates a block error rate (BLER) target and transmitting the second data to the UE using the selected LAP comprises transmitting the second data to the UE using the BLER target.

In some embodiments, transmitting the second data to the UE using the BLER target comprises selecting a transport block size, TBS, based on the BLER target and transmitting the second data to the UE using the selected TBS.

In some embodiments, the additional information further comprises neighbor cell information about a third cell served by a third TRP.

In some embodiments, the neighbor cell information about the second cell and/or the third cell comprises Physical Resource Block, PRB, utilization.

In some embodiments, the distance information indicating a distance between the UE and the first TRP comprises a timing advance, TA, indicator transmitted by the UE.

Figure 11:
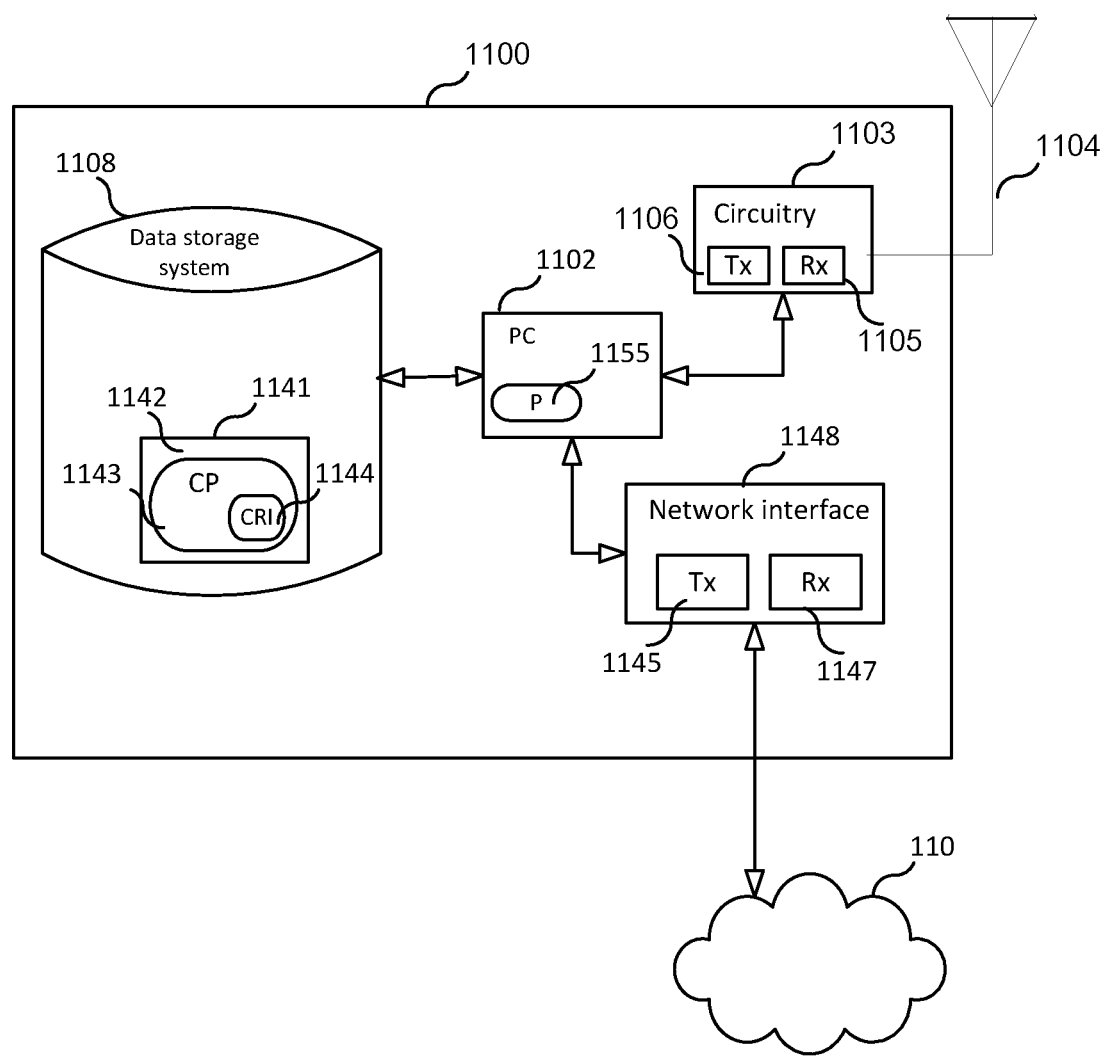
FIG. 11 is a block diagram of a transmission point according to one embodiment.

FIG. 11 is a block diagram of TRP 1100 according to some embodiments. In some embodiments, the TRP 1100 may be a base station or a component of a base station. In some embodiments, a base station may comprise one or more TRPs. As shown in FIG. 11, TRP 1100 may comprise: a processing circuit (PC) 1102, which may include one or more processors (P) 1155 (e.g., a general purpose microprocessor and/or one or more other processors, such as an application specific integrated circuit (ASIC), field-programmable gate arrays (FPGAs), and the like) which processors may be co-located or distributed across different locations; a network interface 1148 comprising a transmitter (Tx) 1145 and a receiver (Rx) 1147 for enabling TRP 1100 to transmit data to and receive data from other nodes connected to a network 110 (e.g., an Internet Protocol (IP) network) to which network interface 1148 is connected; circuitry 1103 (e.g., radio transceiver circuitry comprising an Rx 1105 and a Tx 1106) coupled to an antenna system 1104 for wireless communication with UEs); and local storage unit (a.k.a., "data storage system") 1108, which may include one or more non-volatile storage devices and/or one or more volatile storage devices (e.g., random access memory (RAM)). In embodiments where PC 1102 includes a programmable processor, a computer program product (CPP) 1141 may be provided. CPP 1141 includes a computer readable medium (CRM) 1142 storing a computer program (CP) 1143 comprising computer readable instructions (CRI) 1144. CRM 1142 may be a non-transitory computer readable medium, such as, but not limited, to magnetic media (e.g., a hard disk), optical media, memory devices (e.g., random access memory, flash memory), and the like. In some embodiments, the CRI 1144 of computer program 1143 is configured such that when executed by data processing apparatus 1102, the CRI causes TRP 1100 to perform steps described herein (e.g., steps described herein with reference to the flow charts and/or message flow diagrams). In other embodiments, TRP 1100 may be configured to perform steps described herein without the need for code. That is, for example, PC 1102 may consist merely of one or more ASICs. Hence, the features of the embodiments described herein may be implemented in hardware and/or software.

Figure 12:
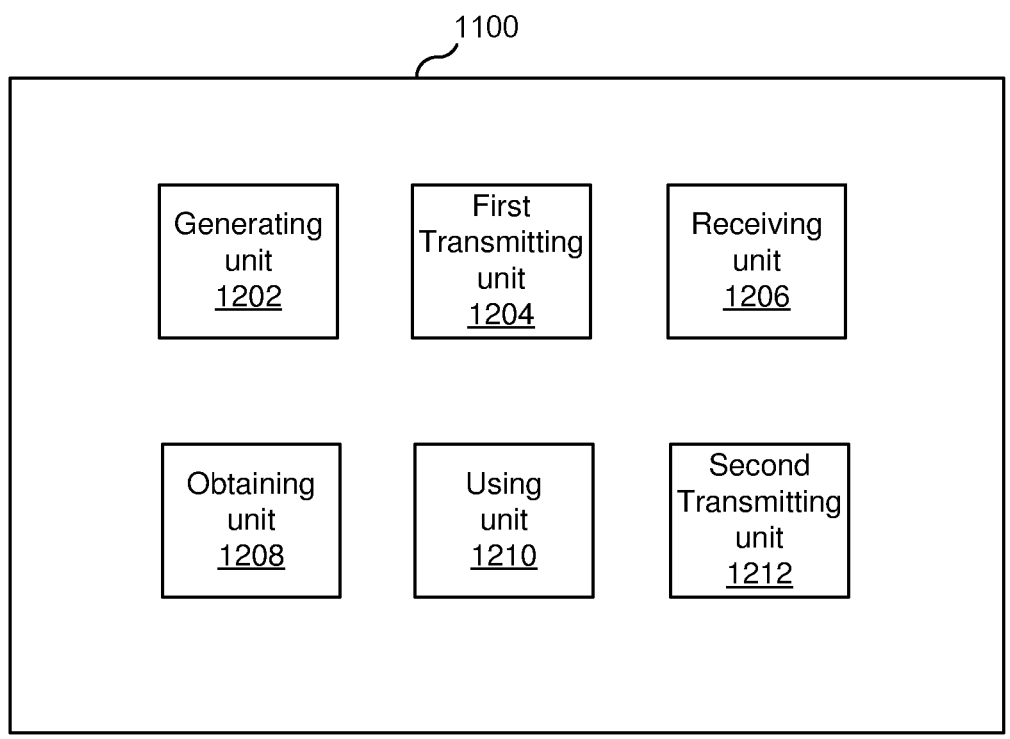
FIG. 12 is a diagram showing functional units of a transmission point according to one embodiment.

FIG. 12 is a diagram showing functional units of TRP 1100 according to some embodiments. As shown in FIG. 12, TRP 1100 includes a generating unit 1202 for generating a machine learning, ML, model, wherein generating the ML model comprises providing training data to an ML algorithm; a first transmitting unit 1204 for transmitting first data to a user equipment, UE, using a first LAP, wherein the first TRP serves at least a first cell; a receiving unit 1206 for receiving a channel quality report transmitted by the UE, the channel quality report comprising channel quality information indicating a quality of a channel between the UE and the first TRP; an obtaining unit 1208 for obtaining additional information, wherein the additional information comprises: neighbor cell information about a second cell served by a second TRP, distance information indicating a distance between the UE and the first TRP (e.g., a timing advance, TA, indicator transmitted by the UE), and/or gain information indicating a radio propagation gain between the UE and the serving node (e.g., an average gain); a using unit 1210 for using the channel quality information, the additional information, and the ML model to select a LAP from a set of predefined LAPs, the set of predefined LAPs comprising the first LAP and a second LAP; and a second transmitting unit 1212 for transmitting second data to the UE using the selected LAP.

Also, while various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for dynamically selecting a link adaptation policy (LAP), the method comprising:
   generating a machine learning (ML) model, wherein generating the ML model comprises providing training data to an ML algorithm;
   a first transmission point (TRP) transmitting first data to a user equipment (UE) using a first LAP, wherein the first TRP serves at least a first cell;
   receiving a channel quality report transmitted by the UE, the channel quality report comprising channel quality information indicating a quality of a channel between the UE and the first TRP;
   obtaining additional information, wherein the additional information comprises: neighbor cell information about a second cell served by a second TRP, distance information indicating a distance between the UE and the first TRP, and/or gain information indicating a radio propagation gain between the UE and the serving node;
   using the channel quality information, the additional information, and the ML model to select a LAP from a set of predefined LAPs, the set of predefined LAPs comprising the first LAP and a second LAP; and
   the first TRP transmitting second data to the UE using the selected LAP, wherein
   the set of predefined LAPs is a set of predefined block error rate (BLER) targets,
   the set of predefined BLER targets comprises a first BLER target and a second BLER target, and
   using the channel quality information (CQI), the additional information, and the ML model to select a LAP from the set of predefined LAPs comprises:
   i) inputting the CQI and the additional information into the ML model, wherein the ML model is configured to use the inputted CQI and additional information to produce a predicted value for the first BLER target;
   ii) determining whether the predicted value for the first BLER target is greater than a predicted value for the second BLER target; and
   iii) selecting the first BLER target as a result of determining that the predicted value for the first BLER target is greater than the predicted value for the second BLER target.

2. The method of claim 1, wherein
   the selected LAP indicates a block error rate (BLER) target, and
   transmitting the second data to the UE using the selected LAP comprises transmitting the second data to the UE using the BLER target.

3. The method of claim 2, wherein transmitting the second data to the UE using the BLER target comprises selecting a transport block size (TBS) based on the BLER target and transmitting the second data to the UE using the selected TBS.

4. The method of claim 1, wherein the additional information further comprises neighbor cell information about a third cell served by a third TRP.

5. The method of claim 4, wherein the neighbor cell information about the second cell and/or the third cell comprises Physical Resource Block (PRB) utilization.

6. The method of claim 1, wherein the distance information indicating a distance between the UE and the first TRP comprises a timing advance (TA) indicator transmitted by the UE.

7. The method of claim 1, wherein the predicted value is a predicted spectral efficiency value.

8. The method of claim 1, wherein the predicted value for the first BLER target is a probability value indicating a probability that the first BLER target is an optimal BLER target.

9. A non-transitory computer readable medium storing a computer program comprising instructions which, when executed by processing circuitry of a device, causes the device to perform the method of claim 1.

10. A first transmission point (TRP) configured to dynamically select a link adaptation policy (LAP), the first TRP adapted to:
   generate a machine learning (ML) model, wherein generating the ML model comprises providing training data to an ML algorithm;
   transmit first data to a user equipment (UE) using a first LAP, wherein the first TRP serves at least a first cell;
   receive a channel quality report transmitted by the UE, the channel quality report comprising channel quality information indicating a quality of a channel between the UE and the first TRP;
   obtain additional information, wherein the additional information comprises: neighbor cell information about a second cell served by a second TRP, distance information indicating a distance between the UE and the first TRP, and/or gain information indicating a radio propagation gain between the UE and the serving node;
   use the channel quality information, the additional information, and the ML model to select a LAP from a set of predefined LAPs, the set of predefined LAPs comprising the first LAP and a second LAP; and
   transmit second data to the UE using the selected LAP, wherein
   the set of predefined LAPs is a set of predefined block error rate (BLER) targets,
   the set of predefined BLER targets comprises a first BLER target and a second BLER target, and
   using the channel quality information (COI), the additional information, and the ML model to select a LAP from the set of predefined LAPs comprises:
   i) inputting the COI and the additional information into the ML model, wherein the ML model is configured to use the inputted COI and additional information to produce a predicted value for the first BLER target;
   ii) determining whether the predicted value for the first BLER target is greater than a predicted value for the second BLER target; and
   iii) selecting the first BLER target as a result of determining that the predicted value for the first BLER target is greater than the predicted value for the second BLER target.

11. The first TRP of claim 10, wherein
   the selected LAP indicates a block error rate (BLER) target, and
   transmitting the second data to the UE using the selected LAP comprises transmitting the second data to the UE using the BLER target.

12. The TRP of claim 11, wherein transmitting the second data to the UE using the BLER target comprises selecting a transport block size (TBS) based on the BLER target and transmitting the second data to the UE using the selected TBS.

13. The first TRP of claim 10, wherein the additional information further comprises neighbor cell information about a third cell served by a third TRP.

14. The first TRP of claim 13, wherein the neighbor cell information about the second cell and/or the third cell comprises Physical Resource Block (PRB) utilization.

15. The first TRP of claim 10, wherein the distance information indicating a distance between the UE and the first TRP comprises a timing advance (TA) indicator transmitted by the UE.

* * * * *